(12) United States Patent
Minami

(10) Patent No.: US 7,654,374 B2
(45) Date of Patent: Feb. 2, 2010

(54) AUTOMATED TRANSMISSION CONTROLLER AND VEHICLE INCLUDING THE AUTOMATED TRANSMISSION CONTROLLER

(75) Inventor: Kengo Minami, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 278 days.

(21) Appl. No.: 11/513,609

(22) Filed: Aug. 31, 2006

(65) Prior Publication Data

US 2007/0240956 A1 Oct. 18, 2007

(30) Foreign Application Priority Data

Apr. 18, 2006 (JP) ............... 2006-114701

(51) Int. Cl.
*B60W 10/02* (2006.01)
*B60W 10/10* (2006.01)

(52) U.S. Cl. ............ 192/3.56; 192/3.63; 192/69.71; 74/339

(58) Field of Classification Search ......... 192/3.58, 192/69.71
See application file for complete search history.

(56) References Cited

U.S. PATENT DOCUMENTS

| | | | |
|---|---|---|---|
| 1,500,878 A | 7/1924 | Kruchten | |
| 5,121,649 A | 6/1992 | Randriazanamparany et al. | |
| 6,223,874 B1 | 5/2001 | Wheeler | |
| H2031 H | 6/2002 | Harrell et al. | |
| 6,481,554 B1 | 11/2002 | Ota | |
| 6,502,681 B1 | 1/2003 | Ota et al. | |
| 2004/0118652 A1 | 6/2004 | Muetzel et al. | |
| 2006/0094567 A1 | 5/2006 | Kosugi et al. | |
| 2006/0124422 A1 | 6/2006 | Zenno | |
| 2006/0128525 A1 | 6/2006 | Zenno | |
| 2006/0128527 A1 | 6/2006 | Zenno et al. | |
| 2006/0160660 A1* | 7/2006 | Zenno et al. | 477/114 |
| 2006/0166788 A1* | 7/2006 | Buchhold | 477/166 |
| 2006/0169561 A1 | 8/2006 | Ooishi et al. | |
| 2006/0169562 A1 | 8/2006 | Kosugi | |
| 2006/0169569 A1 | 8/2006 | Ooishi et al. | |

FOREIGN PATENT DOCUMENTS

| | | |
|---|---|---|
| DE | 10306934 | 9/2004 |
| EP | 0129417 | 12/1984 |
| EP | 0328362 | 8/1989 |
| EP | 0590240 A2 | 4/1994 |

(Continued)

OTHER PUBLICATIONS

EPO European Search Report for EP 06025981, completed Feb. 16, 2007.

(Continued)

*Primary Examiner*—Rodney H Bonck
(74) *Attorney, Agent, or Firm*—Keating & Bennett, LLP

(57) ABSTRACT

Rotational driving force can be transferred to the follower side (clutch plate) of a friction clutch by adjusting the engagement condition of the clutch so that a first gear and a second gear of a dog-clutch-type transmission can rotate relative to each other. At the time of shift change during stop of the vehicle, the clutch can be further connected at a low speed after connection of the clutch until it reaches a reference clutch position.

7 Claims, 12 Drawing Sheets

FOREIGN PATENT DOCUMENTS

| | | |
|---|---|---|
| EP | 0635391 | 1/1995 |
| EP | 0887220 | 12/1998 |
| EP | 0987467 A2 | 3/2000 |
| EP | 1342930 A2 | 9/2003 |
| EP | 1365176 A2 | 11/2003 |
| EP | 1469236 A | 10/2004 |
| EP | 1555461 | 7/2005 |
| EP | 1666772 A | 6/2006 |
| GB | 2170571 | 8/1986 |
| JP | 58-152938 | 9/1983 |
| JP | 61-024858 | 2/1986 |
| JP | 62-017631 | 1/1987 |
| JP | 62-110532 | 5/1987 |
| JP | 02-118269 | 5/1990 |
| JP | 03-172675 | 7/1991 |
| JP | 03-290030 | 12/1991 |
| JP | 4-266619 | 9/1992 |
| JP | 05-026065 | 2/1993 |
| JP | 05-039865 | 2/1993 |
| JP | 08-061487 | 3/1996 |
| JP | 11-082710 | 3/1999 |
| JP | 3044498 | 3/2000 |
| JP | 2000-205411 | 7/2000 |
| JP | 2001-050389 | 2/2001 |
| JP | 2001-146930 | 5/2001 |
| JP | 2001-173685 | 6/2001 |
| JP | 2001-280493 | 10/2001 |
| JP | 2002-067741 | 3/2002 |
| JP | 2002-243034 | 8/2002 |
| JP | 2003-329064 | 11/2003 |
| JP | 2005-282784 | 10/2005 |
| JP | 2006-017221 | 1/2006 |
| WO | WO 91/10979 | 7/1991 |
| WO | WO 98/24008 | 6/1998 |
| WO | WO 02/25131 | 3/2002 |
| WO | WO 2004/005743 | 1/2004 |
| WO | WO 2004/094177 | 11/2004 |

OTHER PUBLICATIONS

EPO European Search Report for EP 06025877, completed Feb. 12, 2007.
EPO Partial European Search Report for EP 06025732.
Co-Pending U.S. Appl. No. 11/514,387, filed Aug. 31, 2006. Title: Clutch Failure Detector, Automatic Clutch System, and Straddle-Type Vehicle.
Co-Pending U.S. Appl. No. 11/514,386, filed Aug. 31, 2006. Title: Clutch Control Device and Vehicle.
Co-Pending U.S. Appl. No. 11/514,000, filed Aug. 31, 2006. Title: Automatic Shift Control Device and Vehicle.
Co-Pending U.S. Appl. No. 11/514,017, filed Aug. 31, 2006. Title: Automated Transmission Controller and Vehicle Including the Automated Transmission Controller.
Co-Pending U.S. Appl. No. 11/513,537, filed Aug. 31, 2006. Title: Automatic Gearshift Control Device and Vehicle.
Co-Pending U.S. Appl. No. 11/469,268, filed Aug. 31, 2006. Title: Clutch Actuator, Engine Unit, and Straddle Type Vehicle.
Co-Pending U.S. Appl. No. 11/469,310, filed Aug. 31, 2006. Title: Clutch Actuator, Engine Unit, and Straddle Type Vehicle.
Co-Pending U.S. Appl. No. 11/469,228, filed Aug. 31, 2006. Title: Clutch Actuator, Engine Unit, and Straddle Type Vehicle.
Co-Pending U.S. Appl. No. 11/469,252, filed Aug. 31, 2006. Title: Shift Actuator, Vehicle and Method of Integrating Vehicle.
Co-Pending U.S. Appl. No. 10/591,285, filed Aug. 31, 2006. Title: Riding Type Vehicle.
Co-Pending U.S. Appl. No. 10/591,560, filed Aug. 31, 2006. Title: Speed Change Controller for Straddle-Ride Type Vehicles.
Co-Pending U.S. Appl. No. 10/591,559, filed Aug. 31, 2006. Title: Shift Control for Straddle-Type Vehicle, and Straddle-Type Vehicle.
Co-Pending U.S. Appl. No. 10/591,284, filed Aug. 31, 2006. Title: Actuation Force Transmission Mechanism and Straddle-Type Vehicle.
EPO European Search Report for EP 06025982, completed Feb. 6, 2007.
EPO European Search Report for EP 06025734, completed Feb. 8, 2007.
EPO European Search Report for EP 06025609, completed Feb. 5, 2007.
EPO European Search Report for EP 06025607, completed Feb. 5, 2007.
EPO European Search Report for EP 06025606, completed Feb. 5, 2007.

* cited by examiner

AUTOMATED TRANSMISSION CONTROLLER AND VEHICLE INCLUDING THE AUTOMATED TRANSMISSION CONTROLLER

CROSS-REFERENCE TO RELATED APPLICATIONS

This application claims the priority benefit of Japanese Patent Application No. 2006-114701, which was filed on Apr. 18, 2006 and which is hereby incorporated by reference in its entirety.

BACKGROUND OF THE INVENTIONS

1. Field of the Inventions

The present inventions relate to an automated transmission controller which can automatically execute shift changes, and to a vehicle including such as automated transmission controller.

2. Description of the Related Art

Recently, vehicles with electronically actuated manual transmissions have become commercially available. These transmissions are largely the same as any conventional manual transmission, except electronic actuators have been added to allow the otherwise manual transmission to be operated electronically.

The actuators are used to automate certain operations so that the system can automate a series of start, stop and shift change operations (clutch disengagement, gear change, and clutch engagement) based on the rider's intention or the state of the vehicle. In at least one such known automated transmission controller, the torque of the shift actuator is temporarily reduced and then increased when the respective gears cannot engage with each other, i.e., during a so-called "dog-contact condition" occurring at the time of shift change. In this manner, the dog-contact is rectified and the gears then properly engage with each other. For example, Japanese Patent Document No. JP-A-11-082710 discloses such a controller.

SUMMARY OF THE INVENTIONS

An aspect of at least one of the embodiments disclosed herein includes the realization that where a shift actuator is subject to a cycling load in order to overcome the dog-contact condition described above, an excessive amount of electrical energy can be used. Additionally, such a shift actuator would normally be designed to be more robust and thus more expensive to withstand the cyclic loading. More memory is also required to store a larger program to perform this additional cycling on the shift actuator. Additionally, further processing power is required to more accurately control the load on the shift actuator to perform such cycling. Finally, the method of cycling the shift actuator cannot solve the problem of a dog contact condition when both the main shaft and the drive shaft are stopped, for example, when the associated vehicle is stopped.

Thus, in accordance with an embodiment, an automated transmission controller can comprise a friction clutch and a dog-clutch-type transmission having a plurality of first gears on which engaging projections are formed and a plurality of second gears on which engaging concaves engaging with the engaging projections are formed, the engaging projections of the first gears engaging with the corresponding engaging concaves of the second gears to effect a change in gear ratios in the dog-clutch-type transmission. The controller can also include an automated transmission unit having an electrically powered actuator configured to conduct connection and disconnection of the friction clutch, the automated transmission unit also being configured to conduct gear ratio changes of the dog-clutch-type transmission. A control unit can be configured to control the operation of the actuator, and a gear position sensor can be configured to detect the gear position of the dog-clutch-type transmission. The control unit can be configured to perform gear change assist control under which, at the time of shift change, the clutch position of the friction clutch is shifted to the connection side at a connection speed lower than a connection speed until the clutch position reaches a reference clutch position which is located on the disconnection side from a first clutch position where the half-clutch condition ends and on the connection side from a second clutch position where the friction clutch is in the largest possible disconnection condition for its structure, during a period from the time when the clutch position reaches the reference clutch position until the time when engagement condition between the engaging projections and the engaging concaves is detected by the gear position sensor.

In accordance with another embodiment, an automated transmission controller can comprise a friction clutch and a dog-clutch-type transmission having a plurality of first gears on which engaging projections are formed and a plurality of second gears on which engaging concaves engaging with the engaging projections are formed, the engaging projections of the first gears engaging with the corresponding engaging concaves of the second gears to effect a gear change of the dog-clutch-type transmission. An automated transmission unit can have an electrically powered actuator and configured to conduct connection and disconnection of the friction clutch, the automated transmission unit also being configured to conduct gear ratio changes of the dog-clutch-type transmission. A control unit can be configured to control the operation of the actuator and a main shaft revolution sensor can be configured to detect the revolution of a main shaft connected with the follower side of the friction clutch. The control unit can be configured to perform gear change assist control under which, at the time of gear shift, the clutch position of the friction clutch is shifted to the connection side at a connection speed lower than a connection speed until the clutch position reaches a reference clutch position which is located on the disconnection side from a first clutch position where the half-clutch condition ends and on the connection side from a second clutch position where the friction clutch is in the largest possible disconnection condition for its structure, during a period from the time when the clutch position reaches the reference clutch position until the time when the revolution of the main shaft detected by the main shaft revolution sensor reaches a predetermined value.

In accordance with yet another embodiment, an automated transmission controller can comprise a friction clutch and a dog-clutch-type transmission having a plurality of first gears on which engaging projections are formed and a plurality of second gears on which engaging concaves engaging with the engaging projections are formed, the engaging projections of the first gears engaging with the corresponding engaging concaves of the second gears to effect gear change of the dog-clutch-type transmission. An automated transmission unit can have an electrically powered actuator and being configured to conduct connection and disconnection of the friction clutch, the automated transmission unit also being configured to conduct gear ratio changes of the dog-clutch-type transmission. A control unit can be configured to control the operation of the actuator and a main shaft revolution sensor can be configured to detect revolution of a main shaft connected with the follower side of the friction clutch. A drive shaft revolution sensor can be configured to detect revolution of a drive shaft connected with the main shaft via the dog-clutch-type transmission. The control unit can be configured to perform gear change assist control under which, at the time of shift change, the clutch position of the friction clutch is shifted to the connection side at a connection speed lower than a connection speed until the clutch position reaches a reference clutch position which is located on the disconnection side from a first clutch position where the half-clutch condition ends and on the connection side from a second clutch position where the friction clutch is in the largest possible disconnection condition for its structure, during a period from the time when the clutch position reaches the reference clutch position until the time when the difference between the revolution of the main shaft detected by the main shaft revolution sensor and the revolution of the drive shaft detected by the drive shaft revolution sensor reaches a predetermined value.

In accordance with a further embodiment, a vehicle can comprise a friction clutch and a dog-clutch-type transmission having a plurality of first gears on which engaging projections are formed and a plurality of second gears on which engaging concaves engaging with the engaging projections are formed. Additionally, the vehicle can include means for partially engaging the clutch during a gear change of the dog-clutch-type transmission when the vehicle is stopped, so as to align the projections with the concaves.

BRIEF DESCRIPTION OF THE DRAWINGS

These and other features, aspects and advantages will now be described with reference to drawings of a preferred embodiment. The drawings comprise the following figures.

DETAILED DESCRIPTION OF PREFERRED EMBODIMENTS

Figure 1:
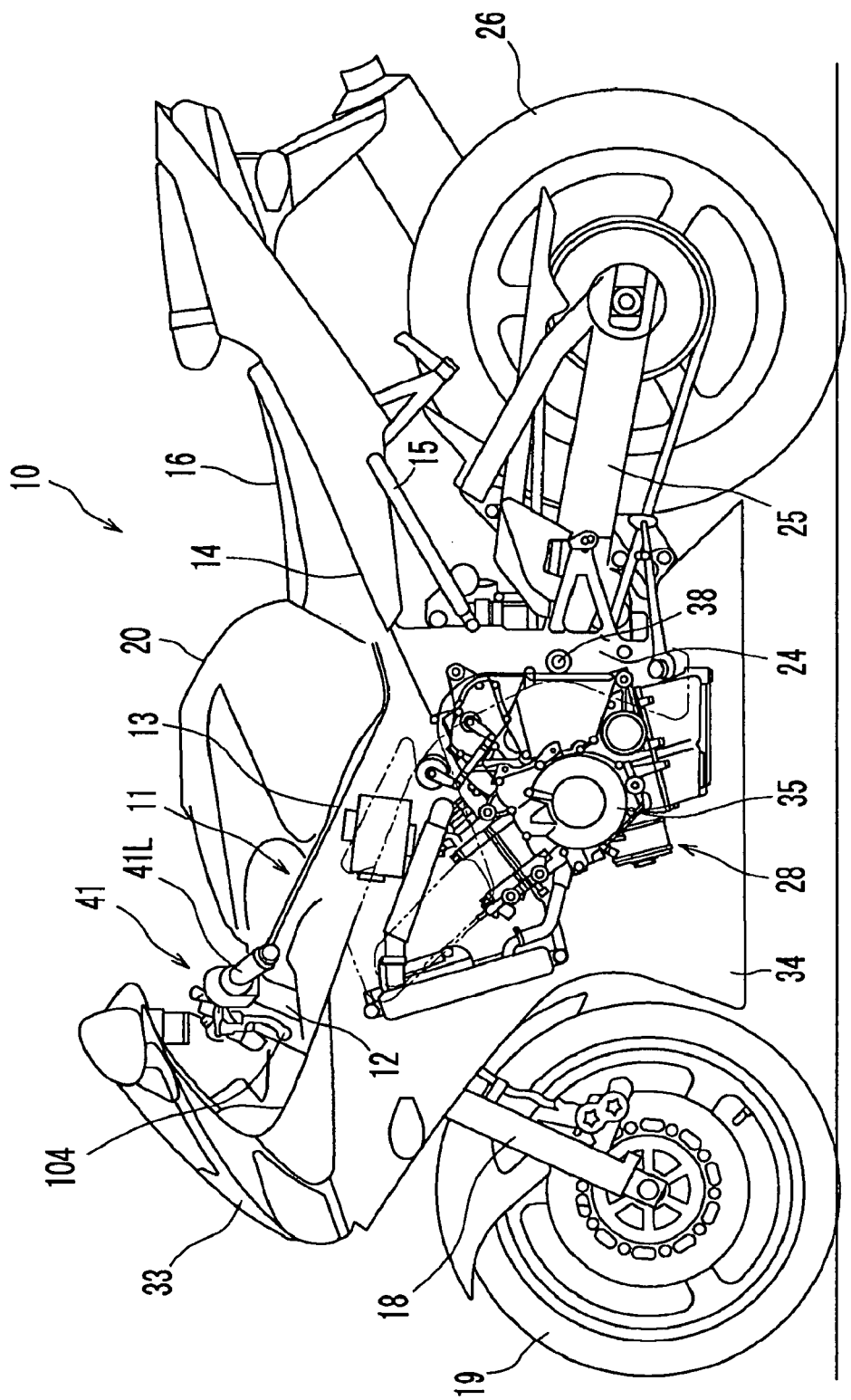
FIG. 1 is a side elevational view of a motorcycle constructed in accordance, with an embodiment.

FIG. 1 is a side view of a motorcycle 10 having a transmission arranged and configured in accordance with an embodiment. The transmission is disclosed in the context of a motorcycle because it has particular utility in this context. However, the transmission can be used in other contexts, such as, for example, but without limitation, scooters, automobiles, as well as other vehicles.

With continued reference to FIG. 1, the motorcycle 10 includes a vehicle body frame 11 defining a framework, and a seat 16 on which a rider sits. The seat 16 is configured such that the rider straddles the seat, astride the vehicle body frame 11, during operation.

The shape of the motorcycle 10 is not limited to that shown in FIG. 1, nor are the maximum speed, displacement volume, size, and other conditions of the vehicle limited thereto. Additionally, the inventions disclosed herein are not limited to a so-called motorcycle-type two-wheel vehicle which includes a fuel tank before the seat, but are applicable to other types of two-wheel vehicles. Moreover, the inventions disclosed herein are not limited to two-wheel vehicles, but may be used with other types of saddle-type vehicle. Furthermore, the inventions disclosed herein are not limited to saddle-type vehicles, but can also be used with other types of vehicles such as four-wheel buggy for two riders.

In the following description, the front-and-rear direction and the left-and-right direction are defined as viewed by the rider sitting on the seat 16.

With continued reference to FIG. 1, the vehicle body frame 11 can have a steering head pipe 12, a main frame 13 extending diagonally downward to the rear from the steering head pipe 12, left and right seat rails 14 extending diagonally upward to the rear from the intermediate position of the main frame 13, and left and right seat pillar tubes 15 connected with the rear end of the main frame 13 and the intermediate positions of the seat rails 14.

A front wheel 19 can be supported by the steering head pipe 12 via a front fork 18. A fuel tank 20 and the seat 16 can be supported on the seat rails 14. The seat 16 can extend from above the fuel tank 20 toward the rear ends of the seat rails 14. The fuel tank 20 can be disposed above the front half parts of the seat rails 14.

A pair of left and right rear arm brackets 24 can be provided at the rear end of the main frame 13. In this embodiment, the rear arm brackets 24 and other components provided on the main frame 13 can be considered as forming a part of the vehicle body frame 11. However, other configurations can also be used.

The rear arm brackets 24 project downwardly from the rear end of the main frame 13. Pivot shafts 38 can be equipped on the rear arm brackets 24, and the front ends of rear arms 25 can be supported by the pivot shafts 38 such that the rear arms 25 can freely swing. A rear wheel 26 can be supported by the rear ends of the rear arms 25.

An engine unit 28 for driving the rear wheel 26 can be supported by the vehicle body frame 11. A crank case 35 can be supported by the main frame 13 in such a manner as to be suspended therefrom. In some embodiments, a gasoline engine (not shown) can be provided in the engine unit 28. However, the engine included in the engine unit 28 is not limited to an internal combustion engine such as a gasoline engine, but may be an electric motor, a hybrid gasoline, electric system, or other types of propulsion systems.

The motorcycle 10 can also include a front cowl 33 and left and right leg shields 34. The leg shields 34 can cover components covering the front parts of the rider's legs. However, other configurations can also be used.

Though not shown in FIG. 1, a brake pedal can be equipped in the lower right area of the motorcycle 10. The brake pedal can be a component for braking the rear wheel 26. The front wheel 19 can be braked by operating a brake lever (not shown) provided in the vicinity of a right grip 41R (see FIG. 2) of a handlebar 41.

A clutch lever 104 can be disposed in the vicinity of a left grip 41L of the handlebar 41. In some such embodiments, engagement and disengagement of the clutch can be effected also by operating the clutch lever 104 as well as automatically, described in greater detail below.

Figure 2:
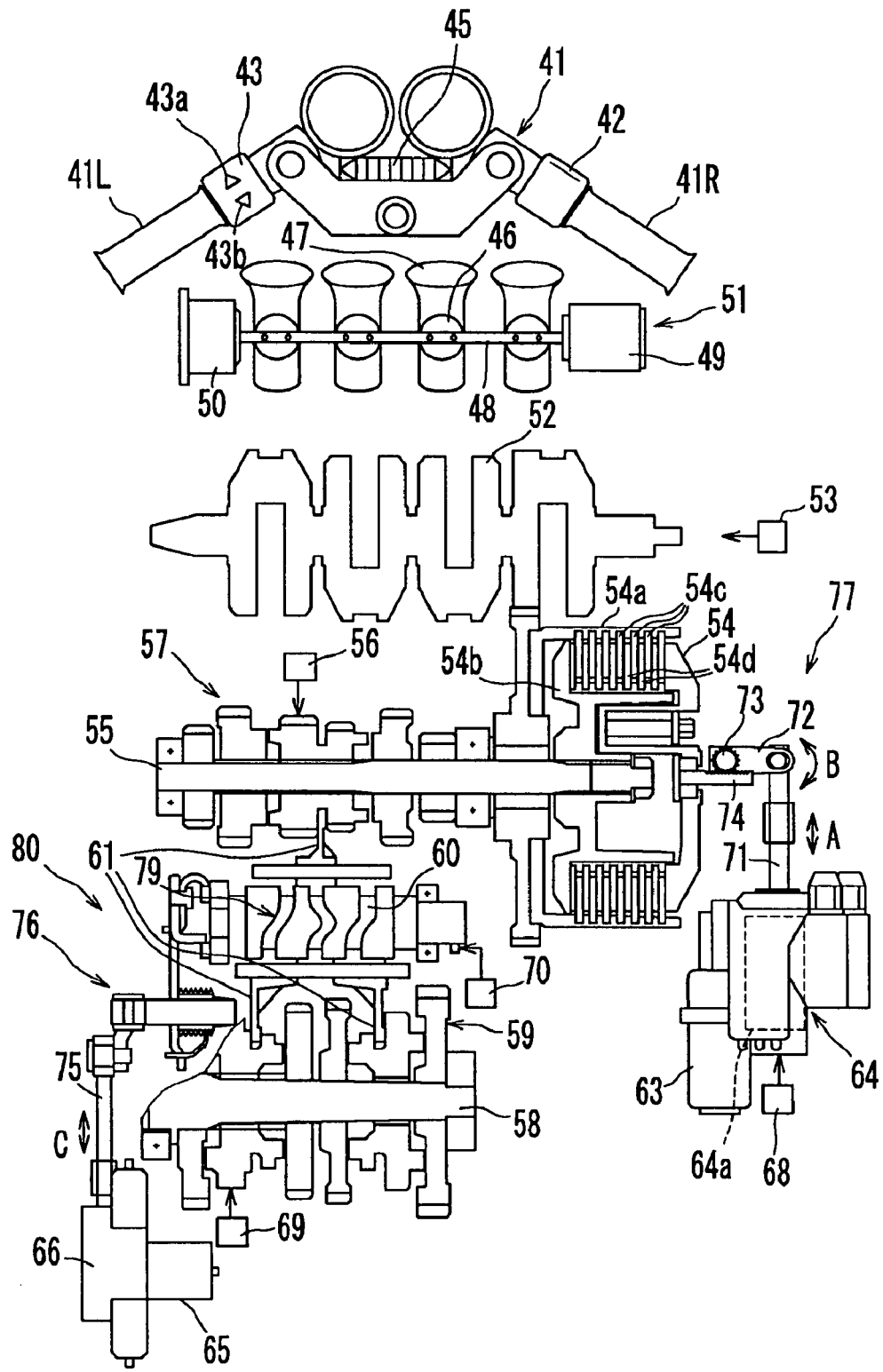
FIG. 2 is a partial exploded and schematic view of a drive system of the motorcycle shown in FIG. 1, the drive system including a transmission.

FIG. 2 illustrates a structure of a driving system that can be used with the motorcycle shown in FIG. 1. In some embodiments, the right grip 41R of the handlebar 41 (see also FIG. 1) comprises a rotatable accelerator grip. A throttle input sensor 42 can be attached to the accelerator grip.

The throttle input sensor 42 can be configured to detect acceleration input (throttle opening input) given by the rider, which can also be referred to as a torque request or power output request. A shift switch 43 can be disposed on the left grip 41L of the handlebar 41, although other locations can also be used.

With continued reference to FIG. 2, the shift switch 43 can include a shift-up switch 43a and a shift-down switch 43b, thereby giving the operator a device for requesting increases and decreases in the gear position. For example, in some embodiments, the motorcycle can be shifted in the range between the neutral position and the maximum gear position (e.g., 6 gear positions in an exemplary but non-limiting embodiment) by manual operation. An indicator 45 can be configured to display the current shift position or the like can be provided at the center of the handlebar 41.

Throttle valves 46 can be attached to throttles bodies 47, which can be considered as forming an air intake passages. A throttle drive actuator 49 can be attached to one end (the right end in the illustrated embodiment) of a valve shaft 48 to which the throttle valves 46 can be rotatably connected. A throttle opening sensor 50 can be attached to the other end (the left end in the illustrated embodiment) thereof. The throttle drive actuator 49 and the throttle opening sensor 50 attached to the valve stem 48 can be considered as forming a DBW (drive by wire) 51 system. However, other configurations can also be used and considered as forming a drive by wire system. The DBW 51 can be configured to open and close the throttles 47 through the throttle drive actuator 49 based on the detection results from the throttle opening sensor 50, as well as other calculations and/or determinations, described in greater detail below.

An engine revolution sensor 53 can be configured to detect rotation of the crankshaft 52. In the illustrated embodiment, the engine revolution sensor 53 is disposed on the right side of a crankshaft 52. However, other positions can also be used.

The crankshaft 52 can be connected to a main shaft 55 via a wet multi-disc-type clutch 54, although other types of clutches can also be used. The clutch 54 can have a clutch housing 54a and a clutch boss 54b. A plurality of friction plates 54c can be attached to the clutch housing 54a, and a plurality of clutch plates 54d can be attached to the clutch boss 54b. Each of the clutch plates 54d can be interposed between the adjoining friction plates 54c, 54c. As noted above, other types of clutches can also be used, including, but without limitation, a dry clutch or a single-plate-type clutch.

The main shaft 55 can have multiple-position (six positions in FIG. 2) transmission gears 57 and a main shaft revolution sensor 56. Each of the transmission gears 57 attached to the main shaft 55 can engage with a corresponding transmission gears 59 attached onto a drive shaft 58 disposed parallel with the main shaft 55. In FIG. 2, the transmission gears 57 and the transmission gears 59 are separated so as to simplify the explanation.

The transmission gears 57, 59 are attached such that either or both of the gears 57, 59, other than the selected gears, are attached to the main shaft 55 or drive shaft 58 during idling of the engine. Thus, driving force can be transmitted from the main shaft 55 to the drive shaft 58 only through a selected pair of the transmission gears. The condition in which the pair of the transmission gears 57 and 59 engage with each other and transmit driving force from the main shaft 55 to the drive shaft 58 is referred to as "gear-in" condition or the "gear position".

The operation for selecting or meshing the desired pair of transmission gears 57 and transmission gears 59 and changing between such pairs can be performed with a shift cam 79. The shift cam 79 can have a plurality of cam grooves 60 (three grooves are illustrated in FIG. 2, although other numbers of grooves can also be used), and shift forks 61 are attached to the respective cam grooves 60.

The respective shift forks 61 engage with the predetermined transmission gears 57 and 59 of the main shaft 55 and drive shaft 58. When the shift cam 79 rotates, the shift forks 61 move along the cam grooves 60 in the axial direction and accordingly the predetermined transmission gears 57, 59 engaging with the splines of the main shaft 55 and drive shaft 58 move in the axial direction. Then, the transmission gears 57, 59 having moved in the axial direction engage with another pair of the transmission gears 57, 59 attached to the main shaft 55 and drive shaft 58 in idling condition to complete the gear change process. The transmission gears 57, 59 and the shift cam 79 can be considered as forming a transmission 80, although other configurations can also be used to form the transmission 80.

Figure 3:
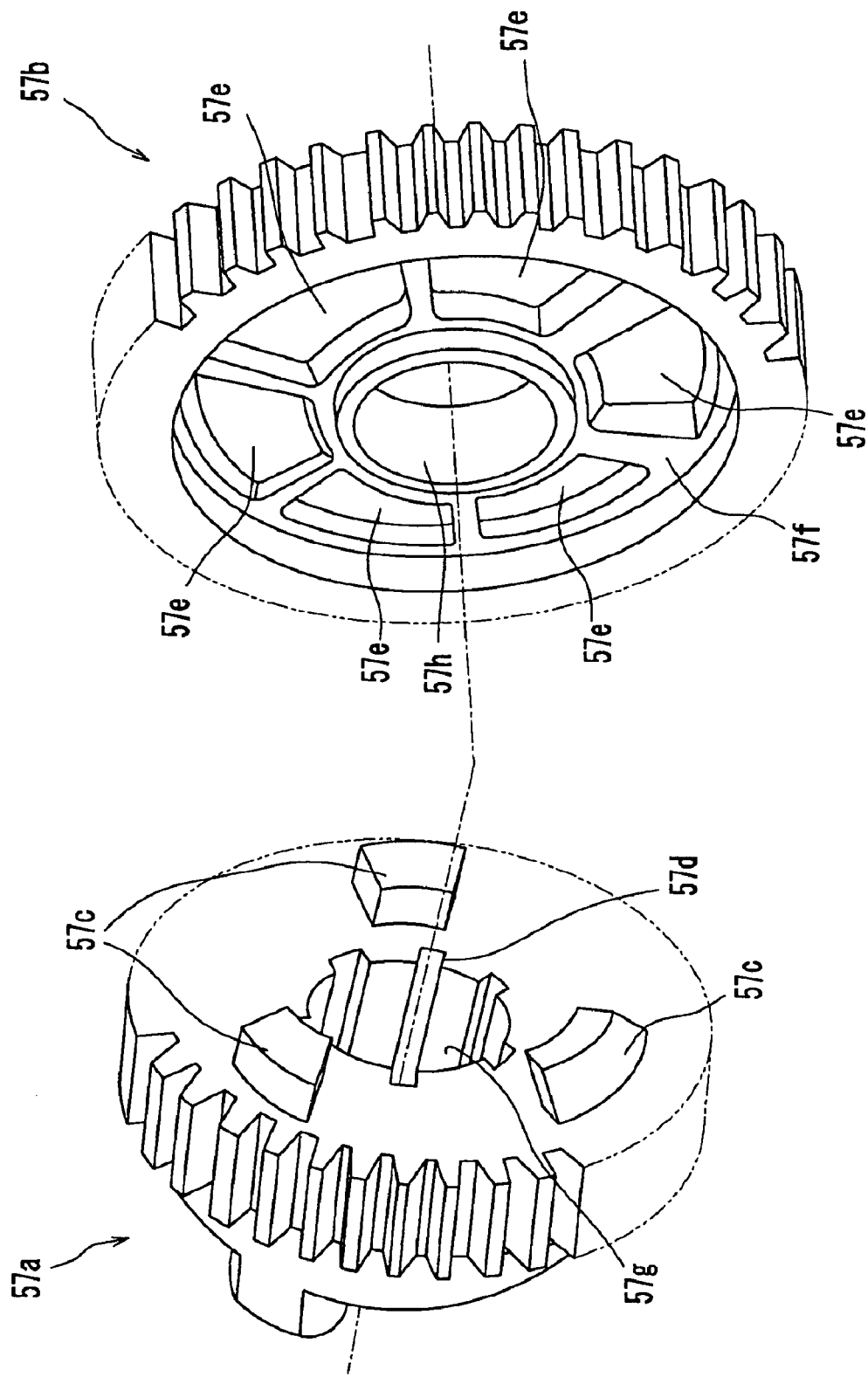
FIG. 3 is a perspective view of two gears that can be used in the transmission of FIG. 2.

The transmission 80 can be a dog-clutch-type transmission. As illustrated in FIG. 3, each of the transmission gears 57 of the transmission 80 has a first gear 57a having engaging projections 57c on an axial end surface thereof, and a second gear 57b having engaging concaves 57e on its axial end surface opposed to the engaging projections 57c. The transmission 80 can include a plurality of first gears 57a and second gears 57b. Also, the transmission 80 can include a plurality of first gears having engaging projections and a plurality of second gears having engaging concaves as the transmission gears 59. Since these structures of the transmission gears 59 are similar to those of the first gears 57a and second gears 57b shown in FIG. 3, explanation of the transmission gears 59 is not repeated herein.

Each of the first gears 57a has the three engaging projections 57c disposed at equal intervals on the outer edge of its axial end surface in the circumferential direction. Each of the second gears 57b has the six engaging concaves 57e also disposed at equal intervals in the circumferential direction. However, other numbers of projections 57c and concaves 57e can also be used.

An insertion hole 57g through which the main shaft 55 and the drive shaft 58 are inserted is formed at the axial center of the first gear 57a. A plurality of grooves 57d are provided along the circumference of the insertion hole 57g. The first gear 57a engages with the splines of the main shaft 55 and the drive shaft 58. The second gear 57b has an insertion hole 57h through which the main shaft 55 and the drive shaft 58 are inserted, but the insertion hole 57h does not have grooves around the hole. Thus, the second gear 57b can be attached to the main shaft 55 and the drive shaft 58 in idling condition.

When the shift cam 79 (FIG. 2) rotates, the shift forks 61 move along the cam grooves 60 and accordingly, the first gear 57a moves along the splines of the main shaft 55 and the drive shaft 58 in the axial direction. Then, the engaging projections 57c of the first gear 57a come to engagement with the engaging concaves 57e of the second gear 57b, thereby changing the combination of the transmission gears 57, 59 for transmitting the driving force from the main shaft 55 to the drive shaft 58 and completing the gear change process.

Additionally, when the shift cam 79 (FIG. 2) rotates, the first gear 57a moves in the axial direction. At this step, the engaging projections 57c of the first gear 57a do not engage with the engaging concaves 57e of the second gear 57b but contact an axial end face 57f of the second gear 57b in dog-contact condition in some cases. Under the dog-contact condition, the first gear 57a and second gear 57b do not engage but contact with each other, failing to securely attain gear change.

As illustrated in FIG. 2, the clutch 54 and the transmission 80 can be operated by a clutch actuator 63 and a shift actuator 65, respectively. The clutch actuator 63 can be connected with the clutch 54 via a hydraulic transmission mechanism 64, a rod 71, a lever 72, a pinion 73, and a rack 74.

The hydraulic transmission mechanism 64 can also include a hydraulic cylinder 64a, an oil tank (not shown), a piston (not shown) and other components. The hydraulic transmission mechanism 64 can also be configured to generate hydraulic pressure by the operation of the clutch actuator 63 and transmits the hydraulic pressure to the rod 71. The rod 71 thus reciprocates in the direction indicated by an arrow A by the operation of the clutch actuator 63, thereby rotating the lever 72 in the direction indicated by an arrow B. As a result, the clutch 54 can be connected or disconnected in accordance with the movement direction of the rack 74. While an electric motor can be used as the clutch actuator 63 in some embodiments, other devices such as a solenoid and an electromagnetic valve, or other actuators can also be used.

An automated transmission controller can comprise the transmission 80, the shift actuator 65, a deceleration mechanism 66, a rod 75, a link mechanism 76, an ECU 100 (FIG. 4) for controlling the operations of the clutch actuator 63 and shift actuator 65. However, other configurations can also be used. An automated clutch device 77 can comprise the clutch 54, the clutch actuator 63, the hydraulic transmission mechanism 64, the rod 71, the lever 72, the pinion 73, and the rack 74. However, other configurations can also be used.

The shift actuator 65 can be connected with the shift cam 79 via the deceleration mechanism 66, a spring 85, the rod 75, and the link mechanism 76. The deceleration mechanism 66 can have a plurality of reduction gears (not shown).

At the time of gear change, the rod 75 reciprocates in the direction indicated by an arrow C by the operation of the shift actuator 65, and the shift cam 79 rotates through a predetermined angle via the link mechanism 76. Then, the shift forks 61 move along the cam grooves 60 by a predetermined amount in the axial direction. As a result, a pair of the transmission gears 57, 59 are fixed to the main shaft 55 and the drive shaft 58, respectively, and thus driving force can be transmitted from the main shaft 55 to the drive shaft 58. While an electric motor can be used as the shift actuator 65 in some embodiments, other devices such as solenoid, an electromagnetic valve, or other devices can also be used.

The hydraulic transmission mechanism 64 connected with the clutch actuator 63 can include a clutch position sensor 68 for detecting a position of the clutch (e.g., a distance between the friction plates 54c and the clutch plates 54d) based on the detection of the stroke position of the piston. While the clutch position can be detected by the clutch position sensor 68 which detects the stroke position of the piston in some embodiments, the clutch position may be detected based on the detection of the position of the transmission mechanism provided between the clutch actuator 63 and the clutch 54.

For example, the clutch position can be detected based on the detection of the position of the rod 71 or the rack 74. The detection of the clutch position is not limited to indirect detection based on the detected stroke position of the piston as in the illustrated embodiment, but can be through direct measurement of the distance between the friction plates 54c and the clutch plates 54d using a sensor (not shown).

The drive shaft 58 can have a vehicle speed sensor 69. The shift cam 79 can have a gear position sensor 70 configured to detect the gear position (e.g., a rotational position of the shift cam 79).

The ECU 100 (engine control unit) can be configured to control the operations of the clutch actuator 63 and the shift actuator 65 in accordance with the operation of the shift-up switch 43a or the shift-down switch 43b to execute shift change. For example, the ECU 100 can be configured to execute a sequential processes involving starting gear change of the transmission gears 57, 59 by the shift actuator 65, disconnecting the clutch 54 by the clutch actuator 63 after elapse of a predetermined time from the start of gear change, and connecting the clutch 54 by the clutch actuator 63, in this order, under a predetermined program or a map at the time of running of the vehicle. However, the ECU 100 can be configured to execute other gear changing processes as well as other operations for the operation of the motorcycle 10.

Figure 4:
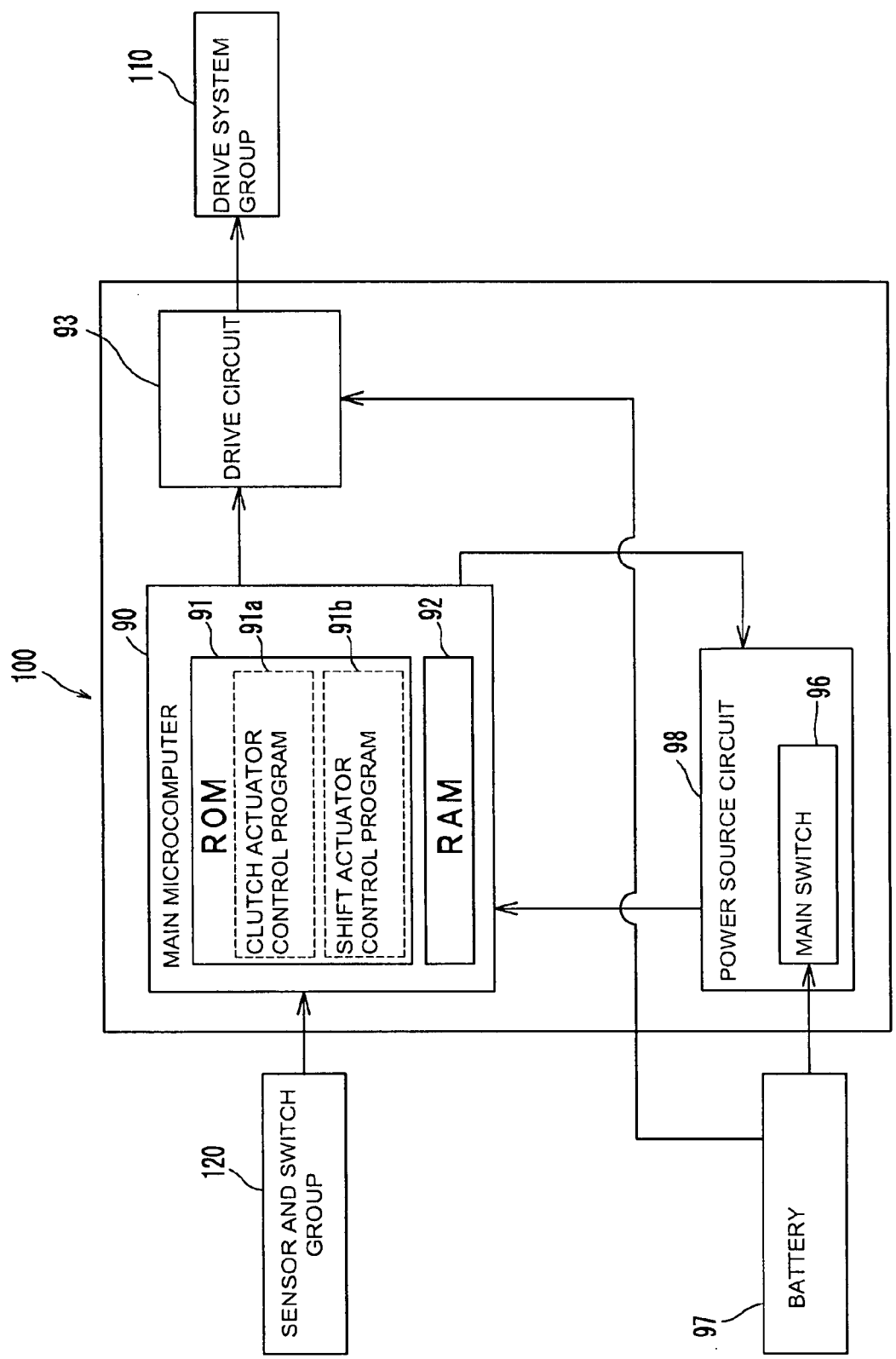
FIG. 4 is a block diagram illustrating a control system that can be used with the motorcycle of FIG. 1.

FIG. 4 is a block diagram illustrating an exemplary structure of a gear change controller that can be provided on the motorcycle 10 for performing gear changes. A drive system group 110 can be connected with a main microcomputer 90 contained in the ECU 100 via a drive circuit 93.

The ECU 100 can be considered as forming a control unit or a gear change controller. However, the gear change controller disclosed herein can also be constructed in other ways. For example, the gear change controller can be in the form of one or a plurality of hard-wired feedback control circuits. Alternatively, the gear change controller can be constructed of a dedicated processor and a memory for storing a computer program configured to perform the control routine of FIG. 7. Additionally, the gear change controller can be constructed of a general purpose computer having a general purpose processor and the memory for storing the computer program for performing the routine of FIG. 7. Preferably, however, the gear change controller is incorporated into the ECU 100, in any of the above-mentioned forms.

Figure 5:
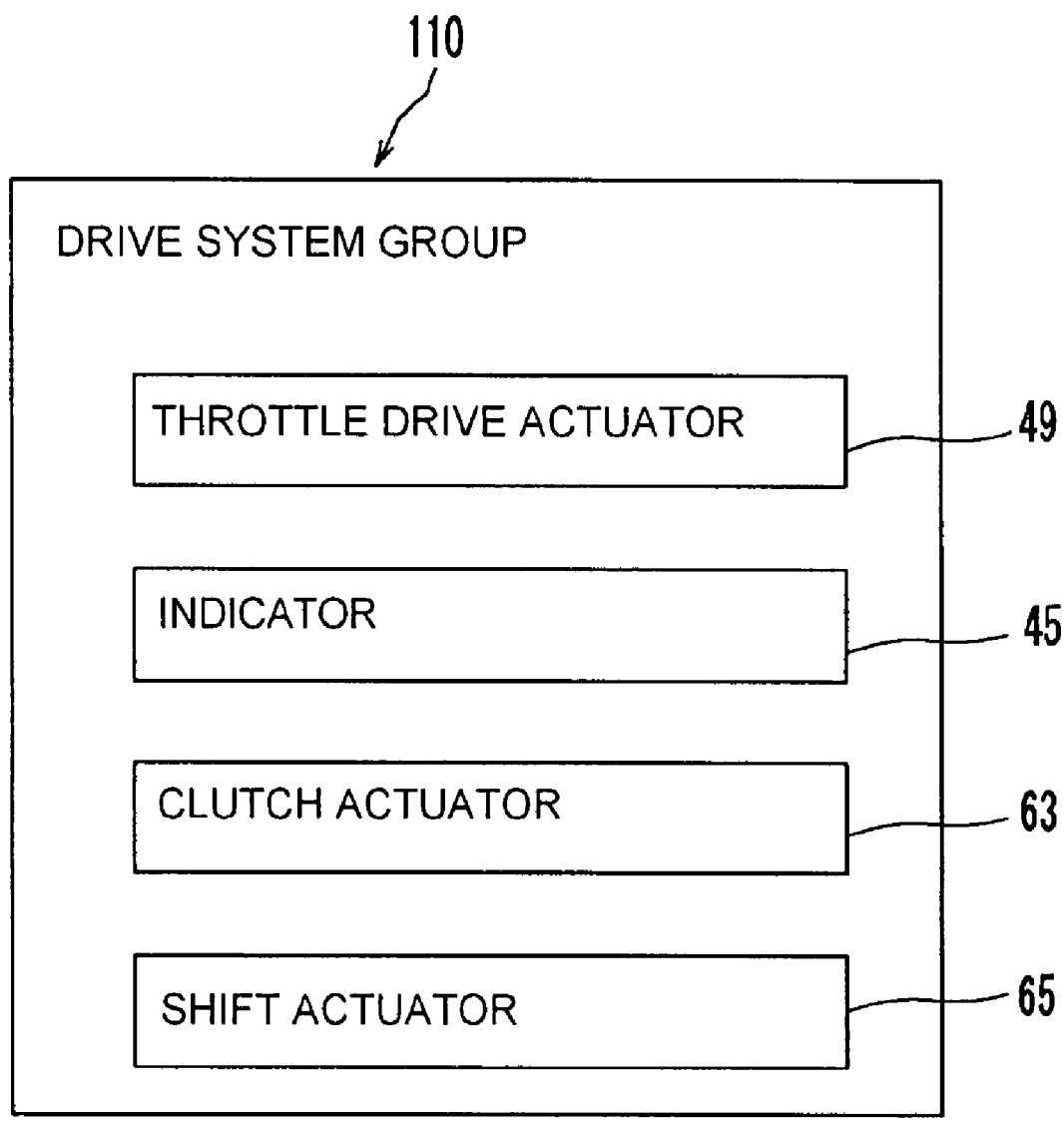
FIG. 5 is a block diagram illustrating a drive system group that can be use with the control system of FIG. 4.

As shown in FIG. 5, the drive system group 110 can include the throttle drive actuator 49, the indicator 45, the clutch actuator 63, and the shift actuator 65 (see also FIG. 2). The drive circuit 93 can be configured to supply appropriate electric current to the respective devices of the drive system group 110 from a battery 97 in response to drive signals sent from the main microcomputer 90. A sensor and switch group 120 can be connected with the main microcomputer 90.

Figure 6:
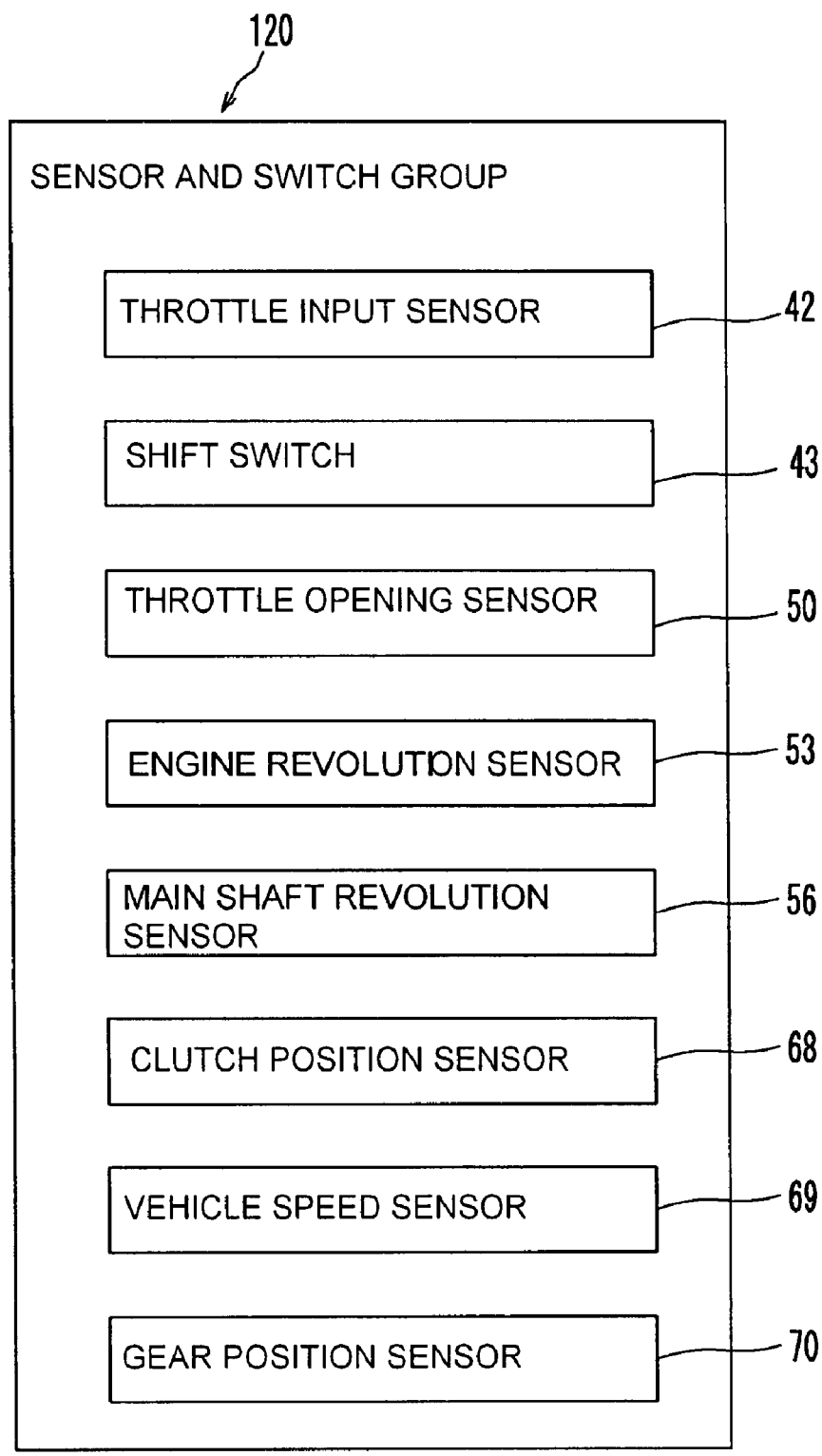
FIG. 6 is a block diagram illustrating a sensor and switch group that can be use with the control system of FIG. 4.

As shown in FIG. 6, the sensor and switch group can be constituted by the throttle input sensor 42, the shift switch 43, the throttle opening sensor 50, the engine revolution sensor 53, the main shaft revolution sensor 56, the clutch position sensor 68, the vehicle speed sensor 69, and the gear position sensor 70 (see also FIG. 2), as well as other sensors. The detection results from the respective sensors can be input to the main microcomputer 90, and then the main microcomputer 90 can supply drive signals to the respective devices constituting the drive system group 110 based on the detection results obtained from the respective sensors to control the operations of these devices.

The main microcomputer 90 can have a ROM 91 and a RAM 92. The ROM 91 can be used to store a clutch actuator control program 91a and a shift actuator control program 91b. The clutch actuator control program 91a can be a program for controlling the operation of the clutch actuator 63. The shift actuator control program 91b can be a program for controlling the operation of the shift actuator 65. The ROM 91 can be constructed in a manner that makes it is impossible for a user to delete these programs stored in the ROM 91, or to write new programs or the like to the ROM 91. However, other types of memory can also be used.

For executing the clutch actuator control program 91a or the shift actuator control program 91b, either of these programs can be loaded into the RAM 92 and read by the main microcomputer 90. Then, the main microcomputer 90 controls the operation of the clutch actuator 63 or the shift actuator 65 under the program in the RAM 92.

A power source circuit 98 connected with the battery 97 can have a main switch 96 which can be turned on or off in accordance with the operation of a key switch (not shown). When the main switch 96 is turned on, the power source circuit 98 converts voltage of the battery 97 into driving voltage for the main microcomputer 90 and supplies the converted voltage to the main microcomputer 90.

Figure 7:
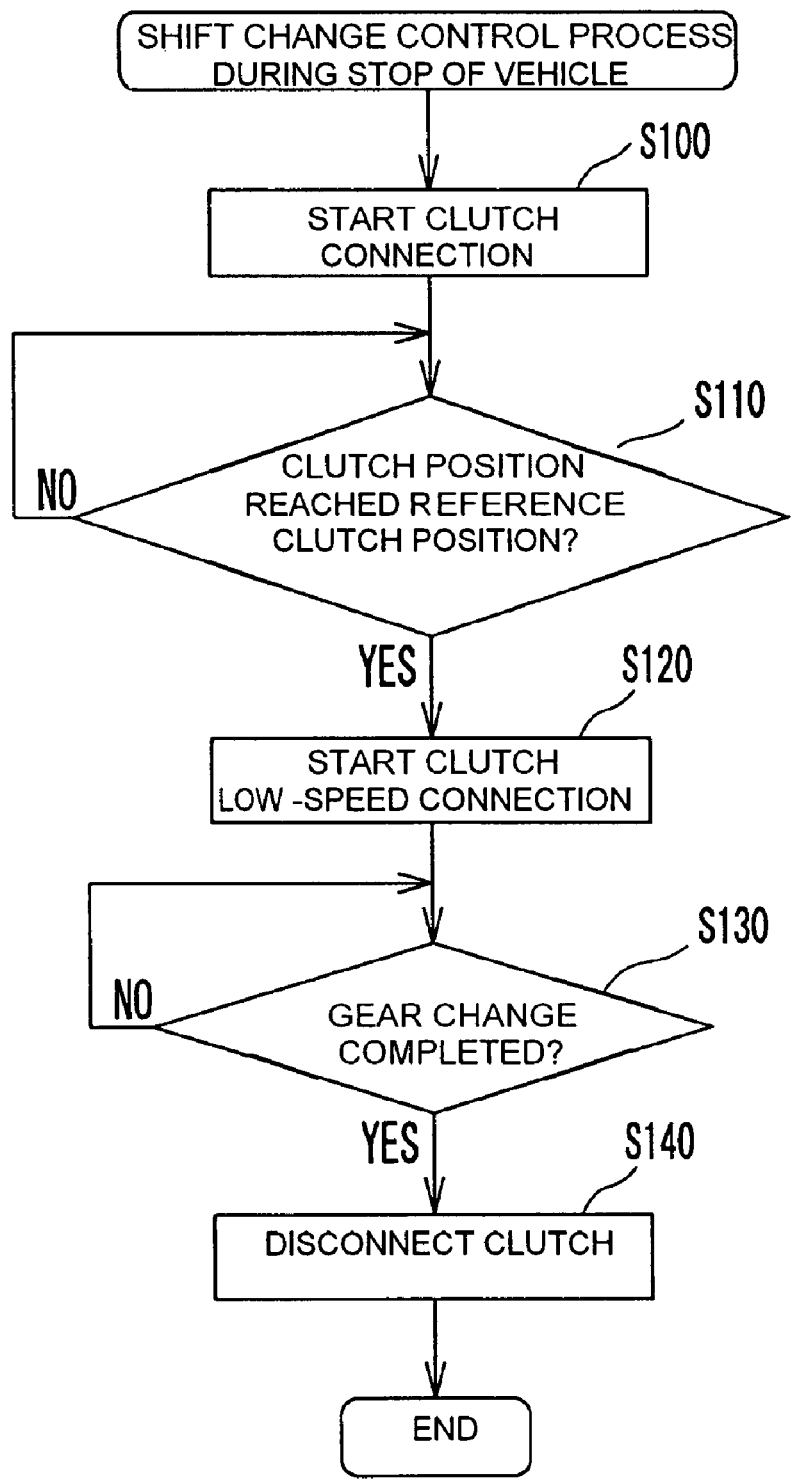
FIG. 7 is a flowchart showing a shift change control process that can be used for operating the control system of FIG. 4.

FIG. 7 is a flowchart illustrating a shift change control process that can be used during operation of a vehicle such as the motorcycle 10. When a shift change is requested by a rider of the motorcycle, e.g., when a rider operates the shift-up switch 43a or the shift-down switch 43b, the shift change control process of FIG. 7 can be used to carry out the rider's desire for a gear change. The procedures shown in FIG. 7 can be carried out for all gear changes, including when the motorcycle 10 is stopped.

For example, when a gear shift is carried out, i.e., the shift-up switch 43a or the shift-down switch 43b is operated during stop of the vehicle, the flow of the gear shift process during stop of the vehicle is obtained from the main routine currently executed before the gear shift process is executed. As noted above, the procedures shown in FIG. 7 can be carried out in shift change to all transmission gear positions.

The shift change control process can be performed on the occasion when a gear shift operation is conducted. However, though the gear shift control process is executed when the gear shift operation is performed, but it is not limited to this, and therefore the gear shift control process may be automatically executed under predetermined conditions such as when the revolution of the engine reaches a predetermined value requiring no gear shift requiring operation by the rider. Thus, the gear shift control process can be automatically performed in response to so-called auto-shift commands.

First, the ECU 100 starts connection of the clutch 54 in step S100. In this step, the ECU 100 can supply a driving signal to the clutch actuator 63 to cause the clutch actuator 63 to start connection of the clutch 54. By the process of this step, the clutch 54 comes to engagement at a constant speed (speed A).

After completion of step S100, it can be determined whether the clutch position has reached a reference clutch position in step S110. In this step, the ECU 100 can judge whether the clutch position corresponds to the reference clutch position. When it is determined that the clutch position has not reached the reference clutch position yet, the flow returns to step S110 and waits until the clutch position comes to the reference clutch position. The reference clutch position is explained later with reference to the figures (FIGS. 8(a) and 8(b)).

When it is determined that the clutch position has reached the reference clutch position step S110, low-speed connection of the clutch starts in step S120. In this step, the ECU 100 can supply a driving signal to the clutch actuator 63, and can require the clutch actuator 63 to initiate low-speed connection of the clutch 54. In the process of step S120, the clutch 54 is connected at a lower speed (speed B) than the connection speed in step S100 (speed A). During the low-speed connection of the clutch 54, constant driving force is transmitted to the clutch boss 54b. When dog-contact condition is caused between the first gear 57a and the second gear 57b, both the gears 57a and 57b rotate relative to each other while contacting each other.

After execution of the process in step S120, it is determined whether gear change has been completed in step S130. In this step, the ECU 100 judges whether gear change has been completed based on the detection result from the gear position sensor 70 (see FIGS. 2 and 6). When it is determined that gear change has not been completed, the flow returns to step S130 and waits until gear change is completed.

When the dog-contact condition is caused and then completion of gear change is determined in step S130, this determination indicates that the dog-contact condition has been canceled. During the processes in steps S120 and S130, gear assist control according to the invention is performed in ECU 100.

When it is determined that gear change has been completed in step S130, disconnection of the clutch is conducted in step S140. In this step, the ECU 100 can transmit a driving signal to the clutch actuator 63 and to cause the clutch actuator 63 to disconnect the clutch 54. When this step is conducted, the clutch 54 is brought to disengagement at a constant speed until the clutch 54 comes to a predetermined clutch position. After execution of the process in step S140, the shift change control process during stop of the vehicle ends.

Figure 8:
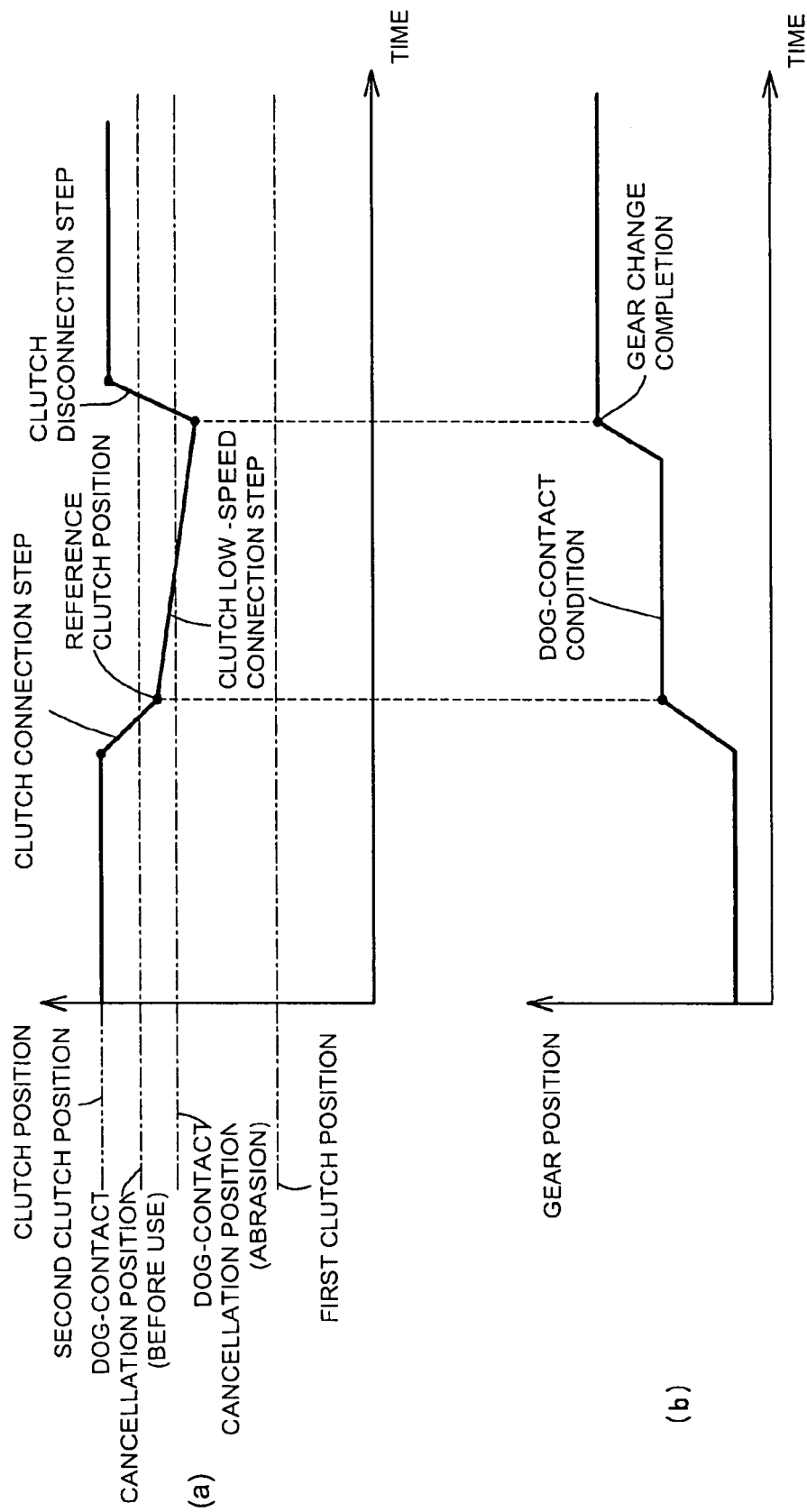
FIGS. 8(a) and 8(b) are timing diagrams showing exemplary control of clutch position and gear position, respectively.

FIGS. 8(a) and 8(b) show the clutch position with elapse of time when the shift change control process during stop of the vehicle shown in FIG. 7 is performed. FIG. 8(a) shows the clutch position from the start till the end of shift change. FIG. 8(b) shows the transmission gear position (gear position) with elapse of time from the start till the end of shift up.

As shown in FIG. 8(a), the clutch 54 is connected at a constant speed in the clutch connection step. In this step, the connection of the clutch 54 is effected at the fixed speed (speed A). When the clutch position of the clutch 54 reaches the reference clutch position located between a first clutch position and a second clutch position, low-speed connection of the clutch 54 starts. During the low-speed connection, the clutch 54 is connected at the speed B which is slower than the speed A.

The first clutch position is a clutch position at which the half-clutch condition ends, which position corresponds to the lowest limit value of the distance between the friction plate 54c and the clutch plate 54d when the stop condition of the vehicle body is maintained without advance under the idling condition of the stopped motorcycle 10. The second clutch position is a clutch position at which the clutch 54 comes to the largest possible disconnection condition for its structure. According to the motorcycle 10 in the first embodiment, the transmission 80 is in the gear-in condition during stop of the vehicle, and the clutch position of the clutch 54 is maintained at the second clutch position while the engine is operating.

When completion of gear change is detected by the gear position sensor 70 during the low-speed connection of the clutch 54, the clutch disconnection step starts. In the clutch disconnection step, the clutch 54 is brought to disengagement at a constant speed. As described above, the low-speed connection of the clutch 54 is initiated after the clutch position of the clutch 54 reaches the reference clutch position, and thereafter the process flow goes to the clutch disconnection step based on the detection of gear change completion in this embodiment.

The reference clutch position has been established in advance based on the clutch position at which the dog-contact condition is canceled (hereinafter referred to as dog-contact cancellation position) before use of the clutch 54 (that is, when the clutch 54 is new). In this embodiment, the reference clutch position is slightly shifted from the dog-contact cancellation position before use of the clutch toward the connection side. The first clutch position and the second clutch position vary due to abrasion of the friction plates 54c or the clutch plates 54d of the clutch 54, differences among individual bodies of the clutch 54, or for other reasons.

The dog-contact cancellation position also varies due to the abrasion of the clutch 54 or the like. FIGS. 8(a) and (b) show the dog-contact cancellation position before use of the clutch 54c and the dog-contact cancellation position after abrasion thereof. As shown in the figures, the dog-contact cancellation position after abrasion is shifted toward the clutch connection side from the dog-contact cancellation position before use.

Therefore, when the reference clutch position is established based on the dog-contact cancellation position before use of the clutch 54 and then the clutch 54 is used for a long period, the resultant dog-contact cancellation position is shifted from the reference clutch position toward the connection side due to abrasion as shown in FIGS. 8(a) and 8(b). As obvious, in case of abrasion of the clutch 54, the first gear 57a and the second gear 57b do not rotate relative to each other even when the clutch position reaches the reference clutch position, and thus the dog-contact condition cannot be cancelled.

According to this embodiment, however, the clutch 54 is further connected at a low speed after the clutch position of the clutch 54 reaches the reference clutch position. Therefore, when the clutch position reaches the reference clutch position, even when the first gear 57a and the second gear 57b under the dog-contact condition do not rotate relative to each other, the clutch 54 gradually moves further toward engagement and thereafter the clutch position of the clutch 54 reaches the dog-contact cancellation position after abrasion of the clutch 54. After this stage, the clutch position stays on the connection side from the dog-contact cancellation position, and thus the first gear 57a and the second gear 57b under the dog-contact condition can rotate relative to each other, resulting in cancellation of the dog-contact condition.

As described above, according to the motorcycle 10 in this embodiment, rotational driving force is given to the follower side (clutch plate 54d) of the friction clutch by adjusting the engagement condition of the clutch 54 so that the first gear 57a and the second gear 57b can rotate relative to each other. Accordingly, a large volume of current load is not applied to the shift actuator 65, and thus the size of the shift actuator 65 can be decreased. Additionally, since accurate control over the operation of the shift actuator 65 is not required, the size and cost of the ECU 100 can be reduced. Furthermore, since the first gear 57a and second gear 57b are brought to engagement with each other by giving rotational driving force to the follower side of the clutch 54, secure engagement between the first gear 57a and second gear 57b can be attained even when shift change is conducted during stop of the vehicle, resulting in cancellation of the dog-contact condition.

According to this embodiment, the operation of the clutch actuator 63 is controlled such that the clutch 54 is further connected after the clutch position of the clutch 54 reaches the reference clutch position at a lower speed than the connection speed until the clutch 54 reaches the reference clutch position. Thus, when the clutch position having come to the reference clutch position does not reach the dog-contact cancellation position and thus the first gear 57a and second gear 57b cannot be rotated relative to each other, the clutch 54 is gradually brought to engagement until the clutch position reaches the dog-contact cancellation position. After this stage, the clutch position of the clutch 54 stays on the connection side from the dog-contact canceling position. Under this condition, the first gear 57a and the second gear 57b can be rotated relative to each other when the dog-contact condition is caused, and thus the dog-contact condition can be canceled.

Second Embodiment

According to the first embodiment, the low-speed connection of the clutch 54 is ended on the occasion when completion of gear change is detected by the gear position sensor 70. In a second embodiment, however, the low-speed connection of the clutch 54 is ended on the occasion when the revolution of the main shaft 55 detected by the main shaft revolution sensor 56 reaches a predetermined value.

Figure 9:
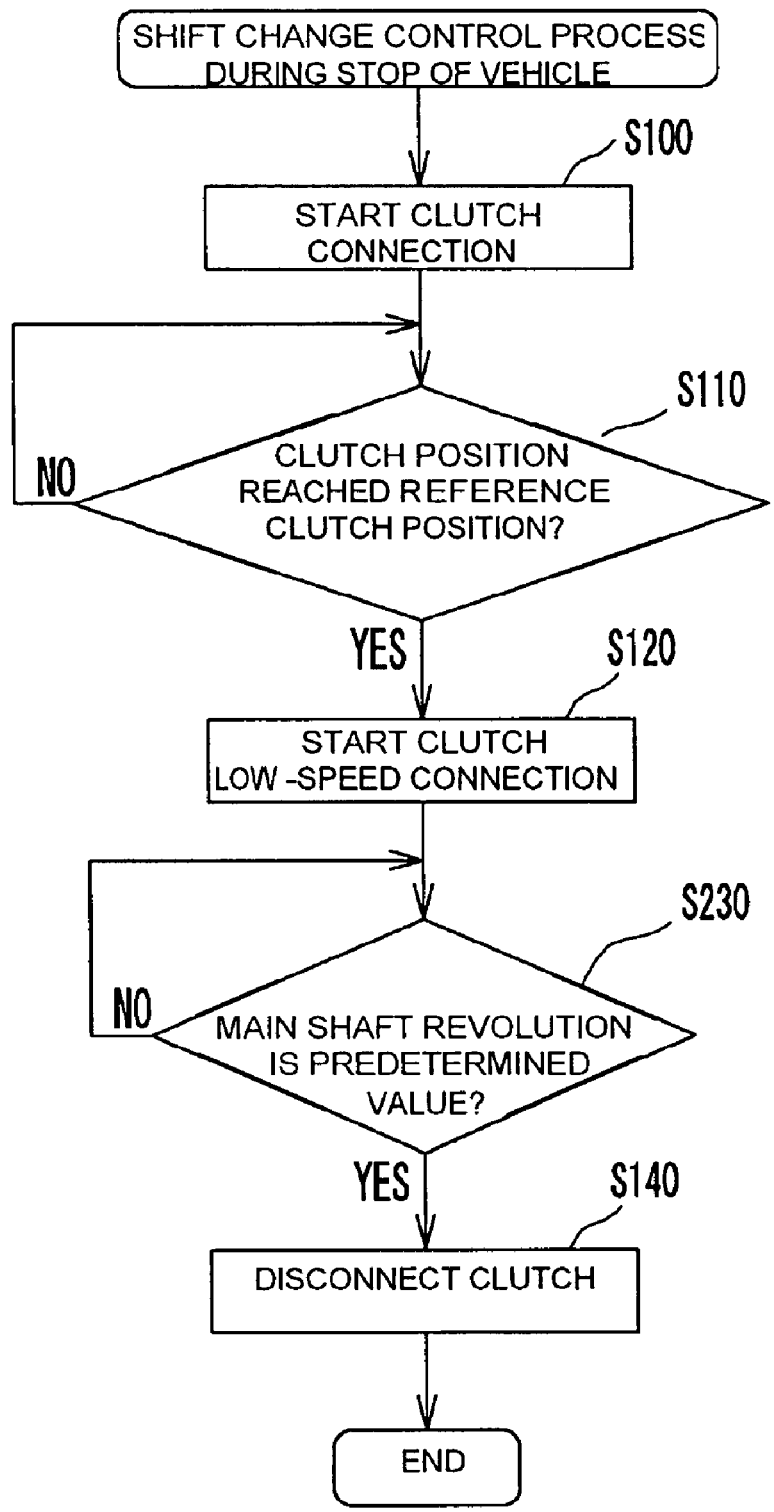
FIG. 9 is a flowchart showing another shift change control process that can be used for operating the control system of FIG. 4.

FIG. 9 is a flowchart showing a shift change control process during stop of a motorcycle, such as the motorcycle 10, in the second embodiment. According to the gear shift control process during stop of the vehicle shown in FIG. 9, step S230 is executed in lieu of step S130 in the gear shift control process during stop of the vehicle shown in FIG. 7. In step S230, the ECU 100 can determine whether the revolution of the main shaft has reached a predetermined value. That is, the ECU 100 judges whether the revolution of the main shaft 55 detected by the main shaft revolution sensor 56 has reached the predetermined value.

When the clutch position is gradually shifted to the connection side from the second clutch position during stop of the vehicle, driving force is given to the main shaft 55 via the clutch 54. However, when the driving force given to the main shaft 55 is small under the dog-contact condition, the main shaft 55 does not rotate. When the driving force given to the main shaft 55 is gradually increased, the first gear 57a and the second gear 57b come to rotate relative to each other while contacting each other and at this stage the main shaft 55 starts rotating.

In some embodiments, the revolution of the main shaft 55 at that time is established as the predetermined value mentioned above. When the revolution detected by the main shaft revolution sensor 56 reaches the predetermined value, the low-speed connection of the clutch 54 (step S120) ends to proceed to the clutch disconnection process in step S140. According to some embodiments, advantages substantially similar to those in the first embodiment can be offered.

The process flow may advance to the clutch disconnection process immediately after the revolution of the main shaft 55 reaches the predetermined value or after elapse of a predetermined time from the time when the revolution of the main shaft 55 reaches the predetermined value. Since the drive shaft 58 is stopped during stop of the vehicle, the main shaft 55 rotates at the moment when the dog-contact condition is cancelled but stops rotating after the dog-contact condition is cancelled. Thus, the process flow may go to the clutch disconnection process after the revolution of the main shaft 55 having reached the predetermined value is decreased to zero.

Third Embodiment

According to the following third embodiment, the low-speed connection of the clutch 54 is ended on the occasion when the difference between the revolution of the main shaft 55 detected by the main shaft revolution sensor 56 and the revolution of the drive shaft 58 detected by the vehicle speed sensor 69 reaches a predetermined value.

Figure 10:
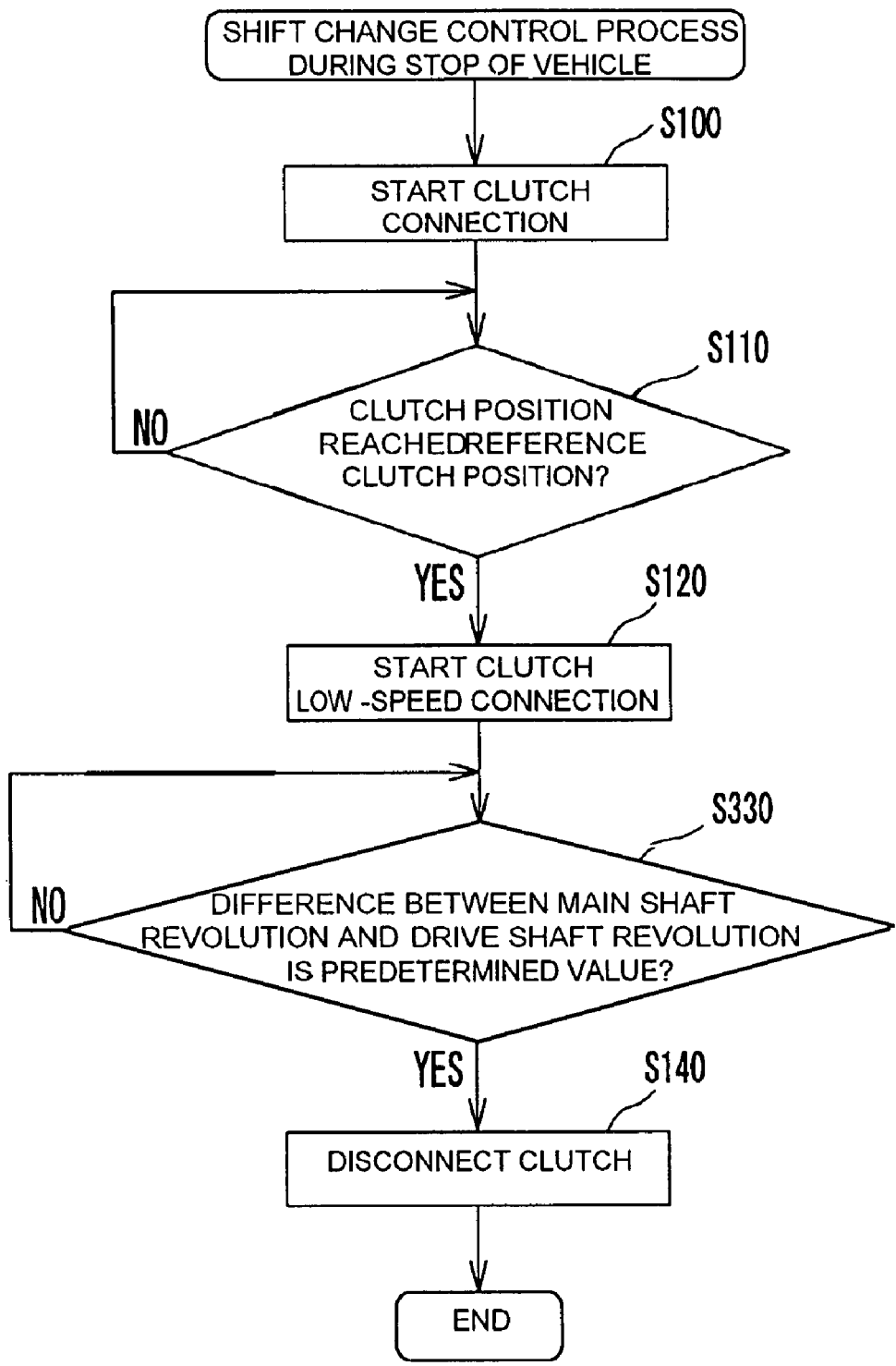
FIG. 10 is a flowchart showing yet another shift change control process that can be used for operating the control system of FIG. 4.

FIG. 10 is a flowchart showing a gear shift control process during stop of a motorcycle, such as the motorcycle 10, in the third embodiment. According to the gear shift control process during stop of the vehicle shown in FIG. 10, step S330 is executed in lieu of step S130 in the shift change control process during stop of the vehicle shown in FIG. 7. In step S330, the ECU 100 can determine whether the revolutions of the main shaft 55 and the drive shaft 58 have reached a predetermined value. That is, the ECU 100 can judge whether the difference between the revolution of the main shaft 55 detected by the main shaft revolution sensor 56 and the revolution of the drive shaft 58 detected by the vehicle speed 69 has reached the predetermined value.

As discussed above, when the dog-contact condition during stop of the vehicle is cancelled, the first gear 57*a* and second gear 57*b* rotate relative to each other while contacting each other and at this moment the main shaft 55 rotates. However, the drive shaft 58 stops during stop of the vehicle. In some embodiments, the difference in revolution between the two shafts 55, 58 at this time is established as the predetermined value, and the respective differences in revolution are calculated based on the detection results of the main shaft revolution sensor 56 and the vehicle speed sensor 69.

When the difference in revolution reaches the predetermined value, the low-speed connection of the clutch 54 (step S120) ends to proceed to the clutch disconnection process in step S140. According to the third embodiment, advantages substantially similar to those in the first embodiment can be offered.

Fourth Embodiment

Figure 11:
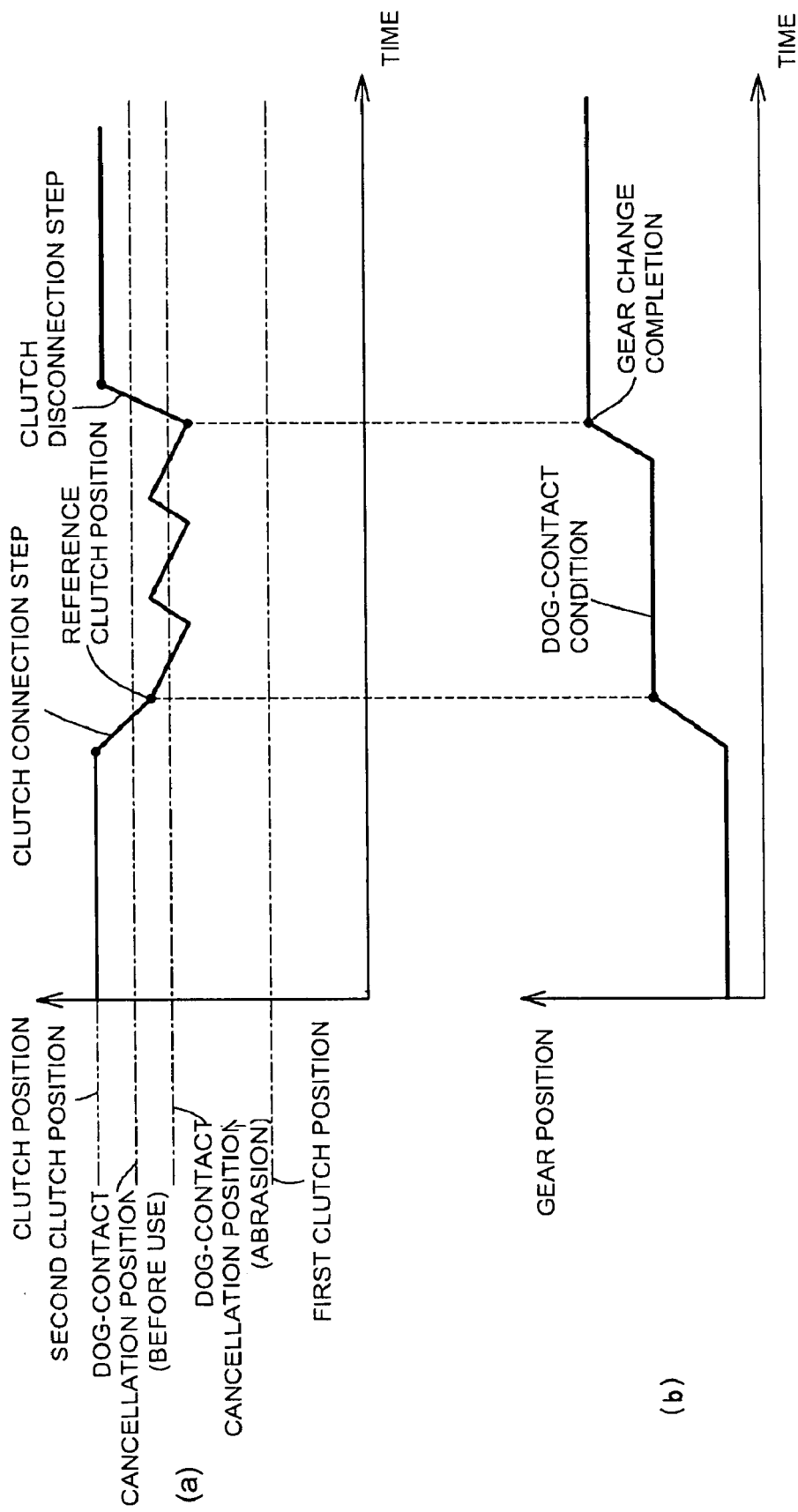
FIGS. 11(a) and 11(b) are timing diagrams showing clutch and gear positions, respectively, during operation of a shift change control process.

FIGS. 11(*a*) and 11(*b*) show the clutch position with elapse of time when a gear shift control process is conducted during stop of a motorcycle, such as the motorcycle 10 according to a fourth embodiment. According to the motorcycle 10 in the fourth embodiment shown in FIGS. 11(*a*) and 11(*b*), the clutch 54 is connected until the clutch position reaches the reference clutch position, and thereafter the low-speed connection and disconnection of the clutch 54 are repeated. When completion of gear change is detected by the gear position sensor 70 during the low-speed connection and disconnection of the clutch 54 is repeated, the clutch disconnection step is initiated. The control of repeating the low-speed connection of the clutch 54 shown in FIGS. 11(*a*) and 11(*b*) also corresponds to the gear change assist control according to the invention.

As described above, according to the motorcycle in the above embodiments, the clutch position of the clutch 54 reaches the dog-contact cancellation position after abrasion while the clutch 54 is repeating connection and disconnection. Thereafter, the clutch position further stays on the disconnection side. Accordingly, the first gear 57*a* and second gear 57*b* can be appropriately rotated relative to each other when the dog-contact condition is caused, and thus the dog-contact condition can be cancelled.

Figure 12:
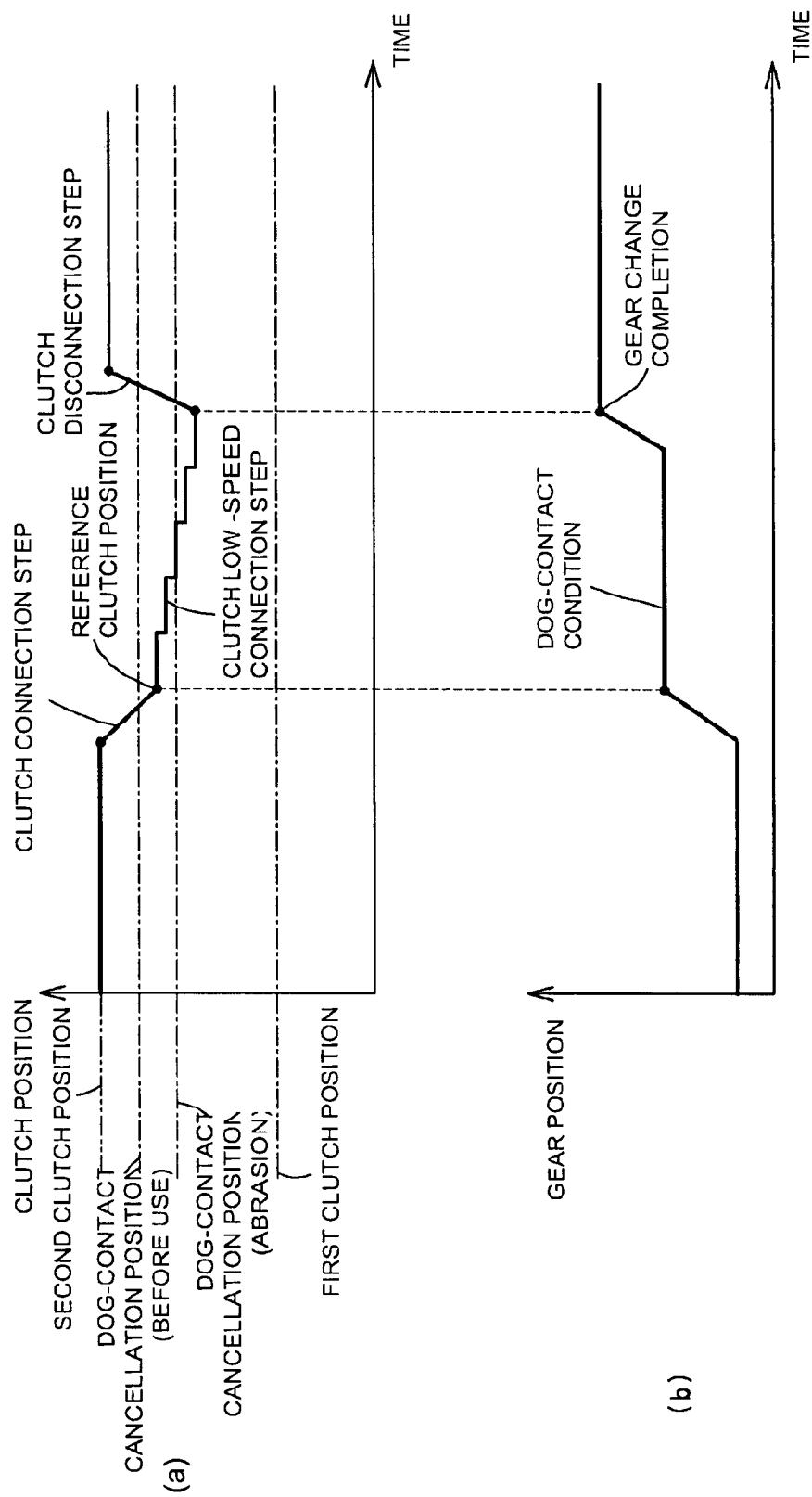
FIGS. 12(a) and 12(b) are timing diagrams showing clutch and gear positions, respectively, during another operation of a shift change control process.

While the clutch 54 is connected at the constant speed during the low-speed connection of the clutch 54 in the first embodiment, the clutch 54 may be connected stepwise as shown in FIGS. 12(*a*) and 12(*b*) during the low-speed connection of the clutch 54.

While the gear change assist control under which the friction plates 54*c* and the clutch plates 54*d* are connected at a low speed at the time of shift change during stop of the vehicle is discussed in the above embodiments, the gear change assist control according to the invention may be conducted not only at the time of shift change during stop of the vehicle but also at the time of shift change during running of the vehicle. As such, the ECU 100, which can also be referred to as a "control unit", along with any of the control routines illustrated in FIGS. 7, 9, and/or 10, can serve as means for partially engaging the clutch at two different speeds during a change of the dog-clutch-type transmission when the vehicle is stopped, so as to move the clutch from a disconnected state toward a connected state at a first higher speed then at a second slower speed when the clutch reaches a reference clutch position located on the disconnection side from a first clutch position where the half-clutch condition ends, thereby rotating at least one of the plurality of first gears to thereby align the projections of the at least one first gears with the concaves of at least one of the plurality of the second gears.

Although the present inventions have been described in terms of certain embodiments, other embodiments apparent to those of ordinary skill in the art also are within the scope of these inventions. Thus, various changes and modifications may be made without departing from the spirit and scope of the inventions. For instance, various components may be repositioned as desired. Moreover, not all of the features, aspects and advantages are necessarily required to practice the present inventions.

What is claimed is:

1. An automated transmission controller, comprising:
   a friction clutch;
   a dog-clutch-type transmission having a plurality of first gears on which engaging projections are formed and a plurality of second gears on which engaging concaves engaging with the engaging projections are formed, the engaging projections of the first gears engaging with the corresponding engaging concaves of the second gears to effect a change in gear ratios in the dog-clutch-type transmission;
   an automated transmission unit having an electrically powered actuator configured to conduct connection and disconnection of the friction clutch, the automated transmission unit also being configured to conduct gear ratio changes of the dog-clutch-type transmission;
   a control unit configured to control the operation of the actuator;
   a gear position sensor configured to detect the gear position of the dog-clutch-type transmission;
   wherein the control unit is configured to perform gear change assist control under which, at the time of shift change, the clutch position of the friction clutch is shifted to the connection side at a first connection speed and a second connection speed, wherein the first connection speed is lower than the second connection speed, the control unit being configured to shift the clutch position toward the connection side, at the second speed, between a second clutch position where the friction clutch is in a completely disconnected condition and a reference clutch position which is located on the disconnection side from a first clutch position where the half-clutch condition ends, the control unit also being configured to shift the clutch position toward the connection side at the first speed during a period from the time when the clutch position reaches the reference clutch position until the time when engagement condition between the engaging projections and the engaging concaves is detected by the gear position sensor; and wherein the control unit is configured to shift the position of the friction clutch to the disconnection side after when the engagement condition is detected.

2. An automated transmission controller according to claim 1, wherein the control unit is configured to perform the gear change assist control after the clutch position of the friction clutch is shifted from the second clutch position to the reference clutch position at the time of shift change during stop of a vehicle, and then the control unit shifts the clutch position of the friction clutch to the disconnection side.

3. An automated transmission controller according to claim 1, wherein the control unit is configured to shift the clutch position of the friction clutch stepwise at the time of the gear change assist control.

4. An automated transmission controller according to claim 1 in combination with a vehicle.

5. An automated transmission controller according to claim 4, wherein the vehicle is a saddle-type vehicle.

6. A vehicle comprising:
a friction clutch;
a dog-clutch-type transmission having a plurality of first gears on which engaging projections are formed and a plurality of second gears on which engaging concaves engaging with the engaging projections are formed;
means for partially engaging the clutch at two different speeds during a gear change of the dog-clutch-type transmission when the vehicle is stopped, so as to move the clutch from a disconnected state toward a connected state at a first higher speed then at a second slower speed when the clutch reaches a reference clutch position located on the disconnection side from a first clutch position where the half-clutch condition ends, thereby rotating at least one of the plurality of first gears to thereby align the projections of the at least one first gears with the concaves of at least one of the plurality of the second gears.

7. A vehicle according to claim 6, wherein the means for partially engaging further comprises means for disengaging the clutch after the projections of the at least one first gears are aligned with the concaves of at least one of the plurality of the second gears.

* * * * *